INVENTORS
CHARLES H WATTERSON
GAIL E. BRINKWORTH
BY Knox & Knox

INVENTORS
CHARLES H. WATTERSON
GAIL E. BRINKWORTH
BY
Knox & Knox

INVENTORS
CHARLES H. WATTERSON
GAIL E BRINKWORTH
BY Knox & Knox

United States Patent Office 3,088,226
Patented May 7, 1963

3,088,226
COLOR COMPOSITOR
Charles H. Watterson, 724 Beryl St., and Gail E. Brinkworth, 743 9th Ave., both of San Diego, Calif.
Filed Apr. 10, 1962, Ser. No. 186,420
8 Claims. (Cl. 35—28.3)

The present invention relates generally to color matching or finding devices and more particularly to a color compositor.

The primary object of this invention is to provide a color compositor by which several colors can be viewed in various combinations over a wide range of strengths or saturation with positive identification of the chroma of each individual color, so that the precise composition of each compounded color can be reproduced.

Another object of this invention is to provide a color compositor wherein a color of particular saturation can be simultaneously viewed individually, in combination with one or two other colors, or further combined with a gray scale to give darkness or value.

Another object of this invention is to provide a color compositor utilizing overlapping discs of stepped color saturation which are easily movable individually to obtain the required composite color.

A further object of this invention is to provide a color compositor having provision for inserting a sample of paper or other material of the surface to be used beneath the composed color for purposes of comparison.

Finally, it is an object to provide a color compositor of the aforementioned character which is simple and convenient to manufacture and use and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawing—which form a material part of this disclosure, and in which:

Construction

In the following description saturation is understood to define the strength or weakness of a color in terms of density, while value is the darkness or lightness provided by the addition of black from a stepped gray scale.

Figure 1:
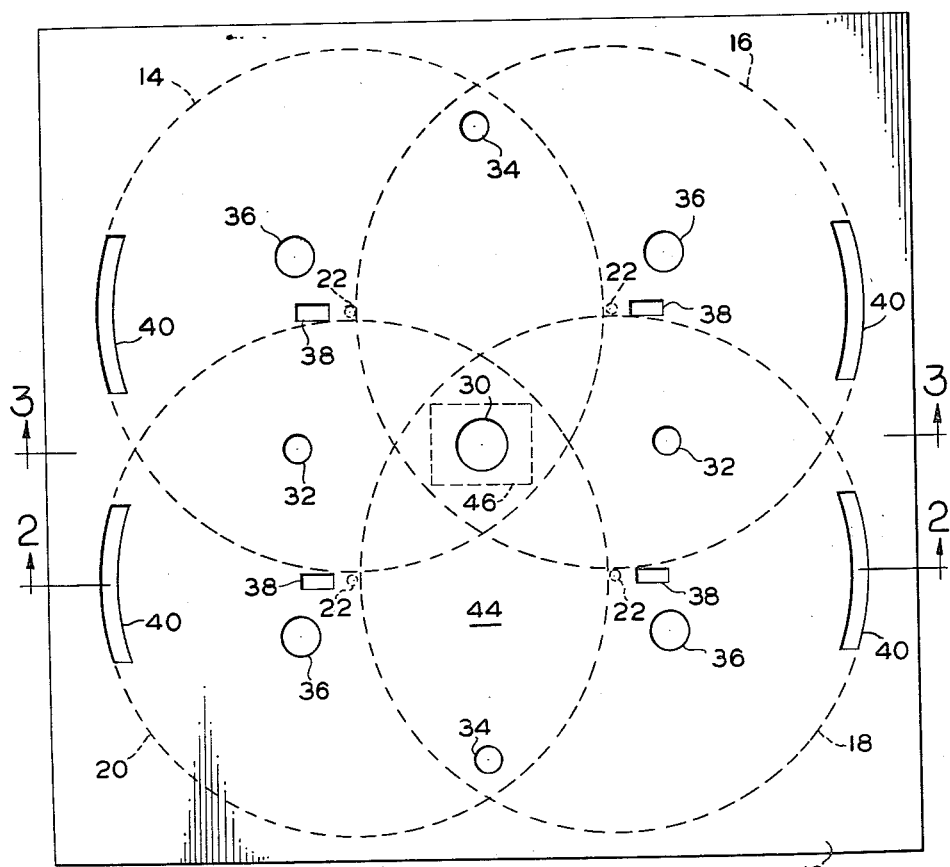
FIGURE 1 is a front face view of the color compositor.
Figure 2:
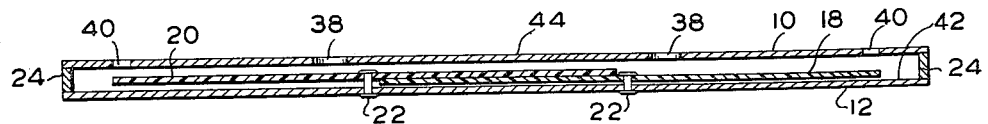
FIGURE 2 is a sectional view taken on line 2—2 of FIGURE 1.
Figure 3:
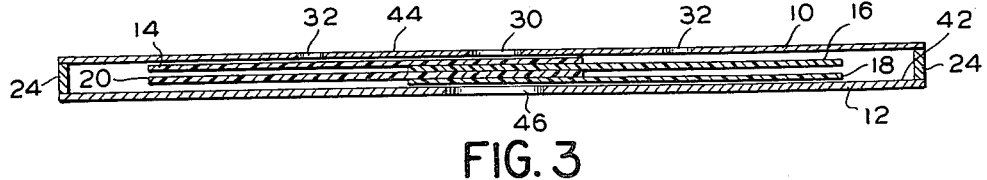
FIGURE 3 is a sectional view taken on line 3—3 of FIGURE 1.

Referring now to FIGURES 1–3 of the drawings, the compositor comprises a front face panel 10 of flat sheet material and a flat back panel 12, both of similar rectangular shape for simplicity. Between the face panel and back panel are four color discs 14, 16, 18, and 20 of thin transparent material, such as sheet plastic, the discs being rotatably mounted on back panel 12 by axial pins 22 and spaced so that the discs overlap equally at a common center. The face panel 10 and back panel 12 are joined at their edges by edge strips 24 of suitable thickness to allow free rotation of the discs. However, with thin plastic discs it may be feasible to join the panel edges directly without separation.

Figure 4:
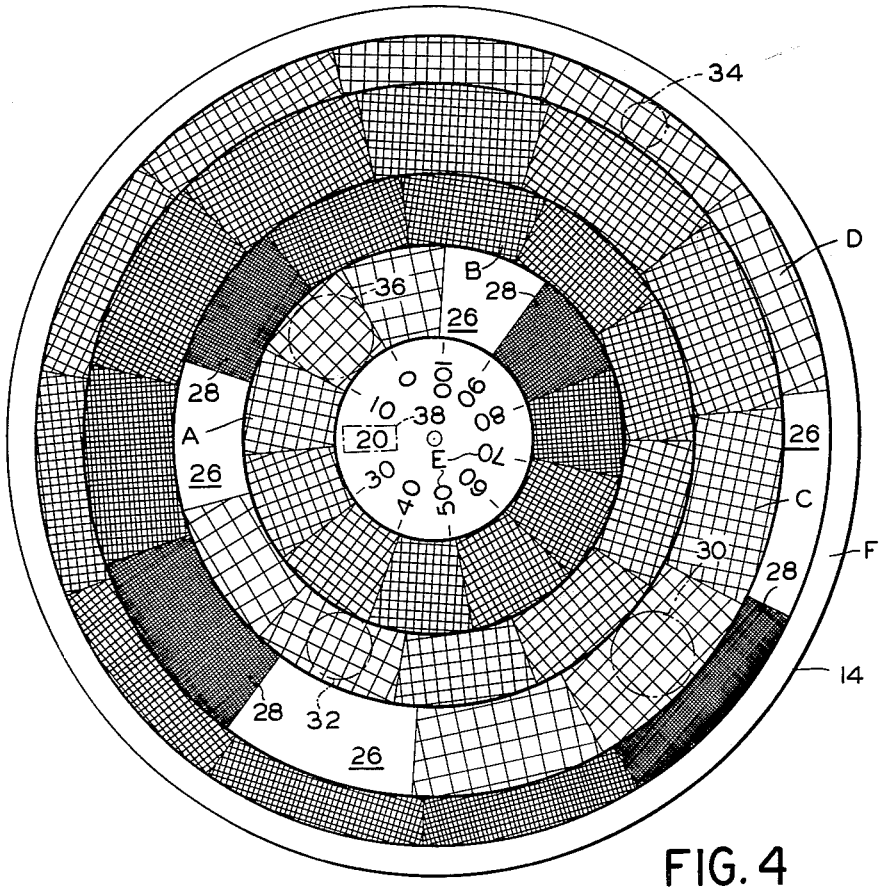
FIGURE 4 is an enlarged face view of a single color disc.

The color discs 14—20 are all basically similar in layout and differ only in actual color or hue. In the arrangement illustrated, disc 14 is black to provide value, disc 16 is blue, disc 18 is yellow and disc 20 is red. For use in photographic or related work the colored discs could be of yellow, cyan and magenta, the recognized photographic primaries, but the principle of the compositor remains the same. A typical color disc is illustrated in FIGURE 4, the black disc 14 being used as an example as indicated by the shading, but the geometrical arrangement being basically applicable to all of the discs. The disc has four concentric bands or rings A, B, C and D, each circumferentially divided into eleven equal segments. Starting with a completely clear or transparent segment 26, the segments of each ring increase in saturation in increments of 10%, indicated by the shading of increasing density, the final segment 28 being of 100% saturation as indicated by the densest shading. If desired the zero saturation, or clear segment of the disc can be cut out completely, although the transparent plastic will not interfere with other superimposed colors under normal circumstances.

It will be seen that the clear segments 26 are not in radial alignment, but appear at different circumferential locations. This arrangement and the plurality of rings are necessary in order that the various combinations of colors of particular saturation can be viewed simultaneously. As illustrated in FIGURES 1 and 3, the face panel 10 has a common central opening 30 beneath which all of the discs overlap. Laterally spaced on either side of opening 30 are a pair of further openings 32 beneath which the vertically separated discs overlap in pairs, the discs 16 and 18 beneath one opening and the discs 14 and 20 beneath the other. Above and below the center are two more openings 34 beneath which the laterally separated pairs of discs 14—16 and 18—20 are overlapped. Also, adjacent the axis of each disc, the face panel 10 has openings 36 beneath which each disc appears individually. The various openings 30, 32, 34 and 36 are spaced at different radial distances from the rotational axes of the discs, so that each exposes a different band of the discs, one group of the openings being indicated in their relative positions in broken line in FIGURE 4. As illustrated, the central opening 30 exposes ring C, openings 32 expose ring B, openings 34 expose ring D and openings 36 expose ring A.

The central portion of the disc inside ring A has numerals E, representing percentages, spaced circumferentially and ranging from 0 to 100 in increments of 10. In the face panel 10 are small rectangular windows 38 radially spaced from the disc axes to expose numerals E individually. The arrangement of the openings and windows may be varied, but the symmetrical configuration illustrated is preferred for ease of reading. The segments in rings A, B, C, D and the numerals E are oriented with respect to each other so that, at any given position, all of the openings 30—36 expose the same saturation of a particular color and the window 38 shows the percentage of that saturation. This will be apparent in FIGURE 4 in which the window 38 shows the percentage 20 and the openings are positioned over the second segment from the clear or zero percentage segment in each of their respective rings.

Figure 5:
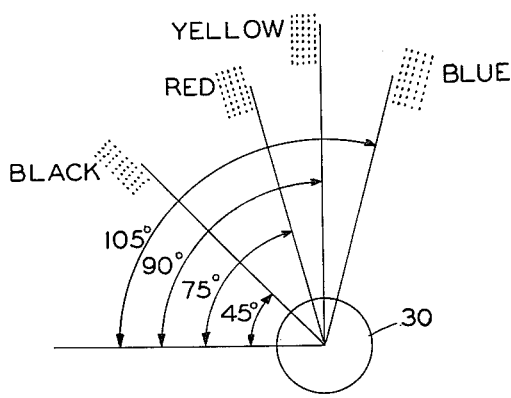
FIGURE 5 is a diagram of the orientation of half-tone dots used on the color discs.

As is well known in the photoengraving art, color pictures are composed of evenly spaced dots of the primary colors, combined where necessary to provide intermediate hues. The dots are conventionally arranged in rows and, if the rows of dots are oriented at certain angles with respect to each other, diffraction patterns appear. To avoid this the dots are aligned at specific angles which avoid distracting diffraction patterns. While this technique is well known, FIGURE 5 is used to illustrate the application to the present color compositor. The dots are aligned to appear in their correct relationship in the central opening 30, where diffraction is most likely to occur. Thus the dots of the black disc are disposed at 45 degrees, the red at 75 degrees, the yellow at 90 degrees and the blue at 105 degrees, all with respect to a horizontal line extending to the left of center at the "9 o'clock" position. Other arrangements are possible, that illustrated being a satisfactory example.

The discs 14—20 are adjusted through arcuate slots 40 adjacent the sides of face panel 10, said slots exposing the outer peripheral rings F of the discs which can thus be engaged by a finger tip to turn each disc individually.

Back panel 12 has a white, reflective inner surface 42 against which the colors are visible, and the outer surface 44 of face panel 10 is preferably finished in a neutral gray to avoid undesirable contrast or interference with the colors. In the center of the back panel 12 is an access slot 46 for insertion of paper samples, as described hereinafter.

Use of the Compositor

The compositor may be used to originate colors or to match existing colors with considerable accuracy. In the field of photoengraving, color pictures are reproduced by multiple plates of the basic separation colors, each plate being etched to a particular depth or density to provide a specific saturation of the respective color. To match a particular color, it is therefore necessary to know the relative percentages of the primary colors which make up the compound color. Starting with the dominant color, the discs 14—20 can be rotated until the compound color in the central opening 30 matches the required color exactly. The percentage of each individual color involved can then be read from the windows 38. Printing plates may be etched to the proportions indicated by the percentages to reproduce the compound color. Or, in some uses, colored inks or paints of the proper primary colors can be mixed in the indicated quantities. By identifying a color in terms of percentages of known primaries, the color can be faithfully reproduced by anyone having the necessary materials, without the need to see the original color as a guide.

If one primary color is not present in a compound color to be composed, the appropriate disc is turned so that the zero or clear segment is under central opening 30. Thus in the central opening one, two, or three colors can be combined, with the addition of the gray scale of the black disc 14 for value. In addition to the combination of colors in opening 30, each color can be seen individually through the openings 36. Also, for quick composing of combinations of two colors, the opening 32 or 34 exposing the appropriate pair of discs can be used. Each disc is easily rotated by a finger through the respective slot 40.

Since the majority of color printing is done on white paper, the white reflective surface 42 will provide the proper background behind the transparent discs. However, if it is necessary to print on any surface or material other than white, a sample of the material can be inserted through access slot 46 under opening 30. Thus the composed color visible through opening 30 will be seen superimposed on the proper surface, making it simple to determine the effect and end result without having to make a test copy by printing.

Simplified Compositors

The color compositor thus far described has the versatility required for professional use, but the minimum size is limited by practical considerations, primarily in the size of the openings through which the colors are viewed. For obvious reasons the area of color visible should be of a size that permits accurate evaluation. Consequently the width of the various color rings and the diameter of the discs should not be too small. While a large compositor may be advantageous in a printing establishment, or the like, it may be desirable to have a smaller, portable compositor.

Figure 6:
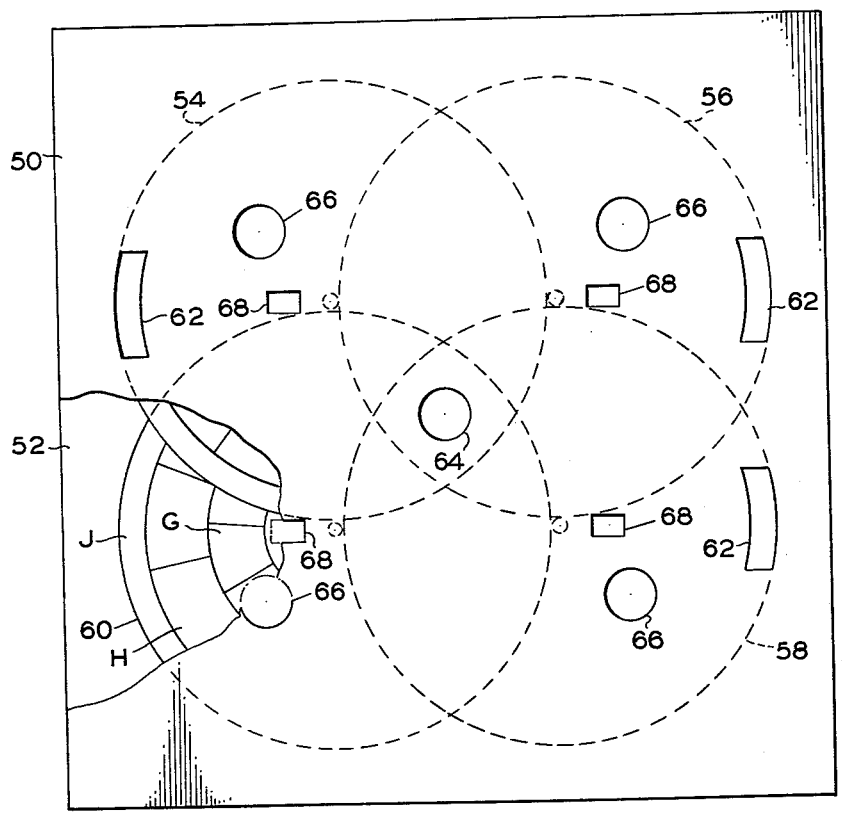
FIGURE 6 is a front face view of a simplified form of the compositor.

A simplified form is illustrated in FIGURE 6, in which the basic structure is similar to that previously described, the compositor having a face panel 50 and back panel 52, with four discs 54, 56, 58 and 60 rotatably mounted in overlapping configuration. Each disc, however, has only two color rings G and H divided into stepped segments, together with the central area on which the percentages are marked and the outer ring J for manual adjustment through slots 62 in face panel 50. All four discs are visible through a central opening 64 which exposes the outer color rings H, each disc being exposed individually through an opening 66 over the color ring G. The segments of each disc are, of course, oriented so that the same saturation appears simultaneously under the opening 62 and the individual opening 64. In addition, the percentage of each color appears in a window 68 as before. In this configuration, combinations of less than four of the discs are obtained by turning the unwanted discs so that their clear segments are under central opening 64. Since the discs with only two color rings are considerably smaller than the four ring discs, the compositor may be more compact, but is still capable of providing all of the color combinations possible with the larger unit. The difference is the lack of all the sub-combinations of colors visible through the extra openings of the larger compositor.

Figure 7:
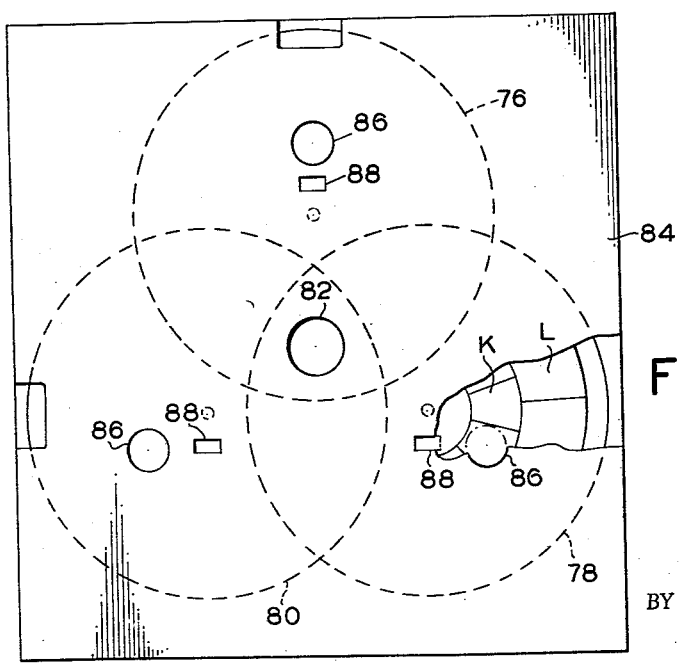
FIGURE 7 is a front face view of a further simplified form thereof.

Certain forms of color printing involve only three colors, or two colors and a gray scale. For this purpose an even more simplified compositor may be used, as in FIGURE 7. In this compositor only three discs 76, 78 and 80 are used and are mounted to overlap under the central opening 82 of a face panel 84. Each disc has two segmented color rings K and L and the face panel 84 has openings 86 to expose each disc individually, with windows 88 to expose percentages.

In each instance colors may be viewed individually, or in any combinations, in exact known proportions which can easily be reproduced. Virtually any color can be matched and analyzed, or composed to suit requirements. By making the axial pins on which the discs rotate removable, discs of different colors can be interchanged for special purposes. The compositor is very compact and will withstand considerable use if made from suitable materials, the only moving parts being the color discs which can be reproduced photographically at low cost and be replaceable. While steps of 10% are indicated for the segments, it will be obvious that for greater accuracy more closely separated steps may be used.

It is understood that minor variation from the form of the invention disclosed herein may be made without departure from the spirit and scope of the invention, and that the specification and drawings are to be considered as merely illustrative rather than limiting.

We claim:
1. A color compositor, comprising:
a face panel;
a plurality of color discs of substantially transparent material, each of a different color and having concentric color rings each divided into segments of progressively increasing saturation in known steps;
said color discs being axially rotatably mounted below said face panel and all overlapping equally at a common area;
said face panel having a first opening above the overlapping area of said color discs, said opening exposing one color ring of each disc;
said face panel having further openings positioned to expose other color rings of each disc;
the segments of said color rings being relatively oriented so that the same saturation of a particular color is exposed simultaneously below all openings relating to that disc.

2. A color compositor, comprising:
a face panel;
a plurality of color discs of substantially transparent material, each of a different color and having concentric rings each divided into segments commencing with a clear segment and increasing in saturation in known progressive steps to a final segment of 100% saturation of the particular color;
said color discs being axially rotatably mounted below said face panel and all overlapping equally at a common area;
said face panel having a first opening above the overlapping area of said color discs, said opening exposing one color ring of each disc;
said face panel having further openings positioned to expose other color rings of each disc;
the segments of said color rings being relatively oriented so that the same saturation of a particular color is exposed simultaneously below all openings relating to that disc.

3. A color compositor, comprising:
a face panel;
a plurality of color discs of substantially transparent material, each of a different color and having concentric rings each divided into segments commencing with a clear segment and increasing in saturation in known progressive steps to a final segment of 100% saturation of the particular color;
said color discs being axially rotatably mounted below said face panel and all overlapping equally at a common area;
said face panel having a first opening above the overlapping area of said color discs, said opening exposing one color ring of each disc;
said face panel having further openings positioned to expose other color rings of each disc;
the segments of said color rings being relatively oriented so that the same saturation of a particular color is exposed simultaneously below all openings relating to that disc;
each of said discs having identification markings corresponding to the saturation of the segments of said color rings;
and said face panel having windows to expose the markings corresponding to the segments simultaneously exposed by said openings.

4. A color compositor, comprising:
a face panel and a back panel;
said back panel having a white reflective surface adjacent said face panel;
a plurality of color discs of substantially transparent material, each of a different color and having concentric rings each divided into segments commencing with a clear segment and increasing in saturation in known progressive steps to a final segment of 100% saturation of the particular color;
said color discs being axially rotatably mounted between said face panel and said back panel and all overlapping equally at a common central area;
said face panel having a first opening above the overlapping area of said color discs, said opening exposing one color ring of each disc;
said face panel having further openings positioned to expose other color rings of each disc;
the segments of said color rings being relatively oriented so that the same saturation of a particular color is exposed simultaneously below all openings relating to that disc.

5. A color compositor according to claim 4 and wherein said back panel has an access slot immediately below said first opening, through which a sample of material may be inserted to be viewed through the combined color discs.

6. A color compositor, comprising:
a face panel and a back panel;
said back panel having a white reflective surface adjacent said face panel;
a plurality of color discs of substantially transparent material, each of a different color and having concentric rings each divided into segments commencing with a clear segment and increasing in saturation in known progressive steps to a final segment of 100% saturation of the particular color;
said color discs being axially rotatably mounted between said face panel and said back panel and all overlapping equally at a common central area;
said face panel having a first opening above the overlapping area of said color discs, said opening exposing one color ring of each disc;
said face panel having further openings positioned to expose other color rings of each disc;
the segments of said color rings being relatively oriented so that the same saturation of a particular color is exposed simultaneously below all openings relating to that disc;
each of said discs having identification markings corresponding to the saturation of individual segments of said color rings in increments of percentage of the saturation of the 100% saturation segment;
and said face panel having windows to expose the markings corresponding to the segments simultaneously exposed by said openings.

7. A color compositor according to claim 6 and wherein said face panel has elongated slots exposing peripheral portions of said color discs for manual rotation thereof.

8. A color compositor according to claim 3, wherein said identification markings are in terms of percentages of known primary colors, whereby a desired ink or paint color can be reproduced.

References Cited in the file of this patent

UNITED STATES PATENTS 2,522,723      Rookyard _____ Sept. 19, 1950